UNITED STATES PATENT OFFICE.

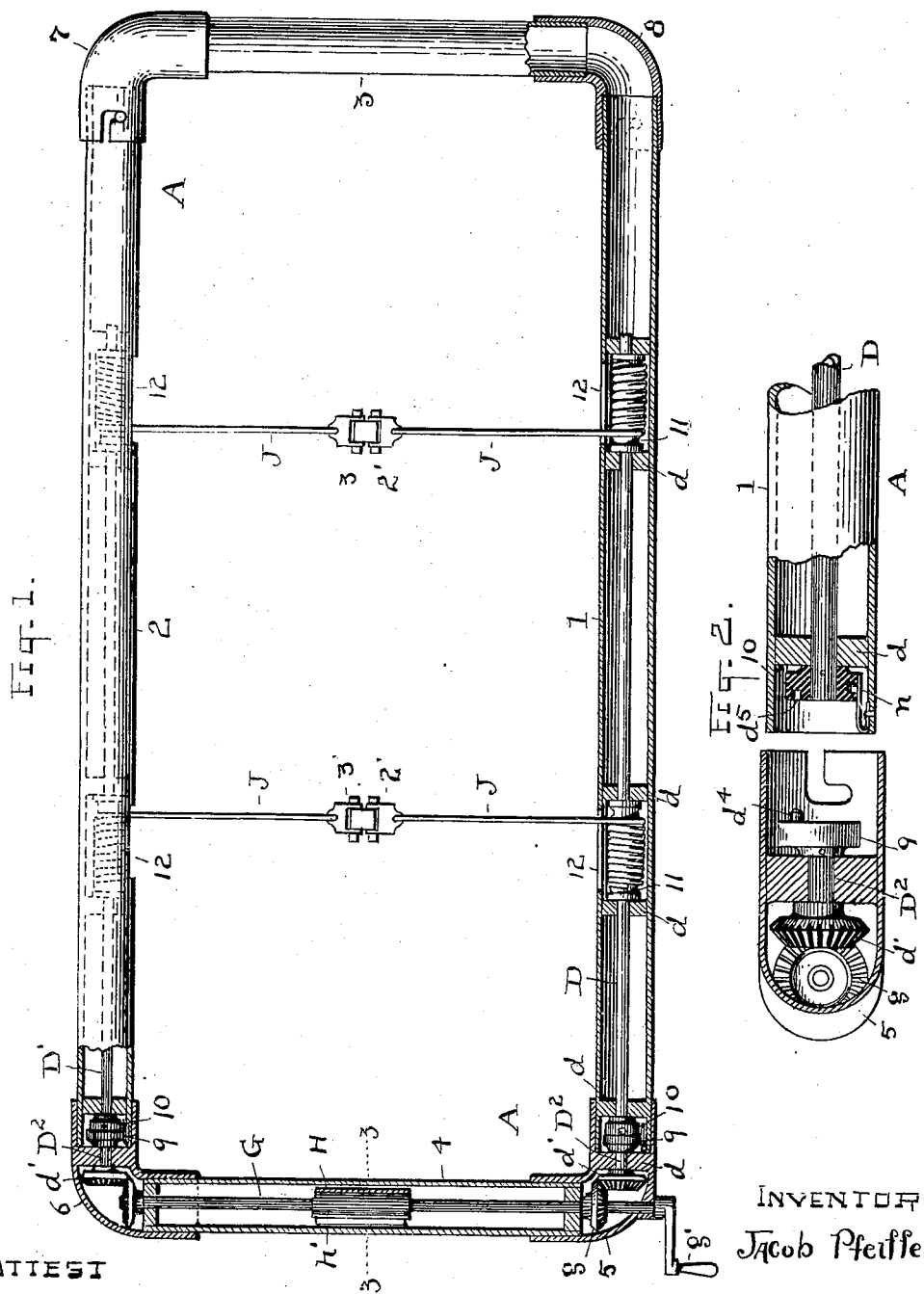

JACOB PFEIFFER, OF AKRON, OHIO.

BURIAL APPARATUS.

SPECIFICATION forming part of Letters Patent No. 636,172, dated October 31, 1899.

Application filed May 8, 1899. Serial No. 715,943. (No model.)

*To all whom it may concern:*

Be it known that I, JACOB PFEIFFER, a citizen of the United States, residing at Akron, in the county of Summit and State of Ohio, have invented certain new and useful Improvements in Burial Apparatus; and I do declare that the following is a full, clear, and exact description of the invention, which will enable others skilled in the art to which it appertains to make and use the same.

The invention relates to what is known as "burial apparatus;" and the invention consists in an apparatus constructed to mechanically lower caskets into graves, all substantially as shown and described, and particularly pointed out in the claims.

Referring to the accompanying drawings, Figure 1 is a plan view, partly in section horizontally, of the framework of the invention and disclosing some of the internal mechanism. Fig. 2 is an enlarged section of a corner portion of the frame and associated mechanism.

The main frame A is comprised in practically four distinct tubes 1, 2, 3, and 4, constituting the sides and heads of the frame, and four corner-elbows 5, 6, 7, and 8, telescopically connected with the tubes 1, 2, 3, and 4. The elbows are in this instance made the overlapping members, and what is known as a "bayonet-joint" is used to connect the parts. However, the connections are preferably such that in the separation of the frame the end tubes and the elbows remain together, and to this end any suitable manner of connecting the parts may be adopted other than that shown, having in view their practically permanent connection; but the tube ends are designed in any event to be constructed at their extremities in such manner as to be readily detachable from the elbows, and hence the connections should be such as will promote rigidity when the parts are coupled up and afford ease in separating them.

The operating mechanism is located within the two side tubes and the head cross-tube and is separably supported therein, so that the said mechanism can be removed or replaced, as may be needed, as well as be disconnected, as above described. This mechanism comprises tubular shafts D and D', respectively, in each side tube, supported in suitable bearings $d$ here and there and having a pinion $d'$ on their upper end sections $D^2$, engaged by a pinion $g$ on the end shaft G. These gears $d'$ and $g$ are bevel or miter gears located in the angle of the elbows 5 and 6, and the shaft G has a crank $g'$ at one end, by which the three shafts are operated—that is, the said crank may be used to rotate the shafts D and D' one way or the other, as occasion may require.

The shafts D and D' at the two sides have couplings 9 and 10, which allow the geared connections or short shaft-sections $D^2$ of the side shafts to remain in their bearings and in geared connection with the shaft G when the frame is knocked down. Upon each side shaft also are two worms or spools 11, with a worm-channel and of a size to have the casket-carrying lines or cords J wound thereon and yet freely rotate within the tubes, and the said tubes have slots 12 opposite the said spools or worms along their inner side to accommodate the ropes J in their travel from one end to the other of the spool. By using spools or worms of this kind I am enabled to not only get an easy operation for the lowering process, but I am also enabled to place all the working parts of all kinds within the tubes, thus avoiding unsightly exposure and protection against rain and the like. The cords J are four in number, one for each worm, and all the worms and gears on the two sides are alike, so that there will be perfect uniformity in their operation. The extremities of the said cords or lines J are provided each with a section 2' and 3', respectively, of an automatically-separable coupling, which is firmly locked during the lowering of the casket, but which when the casket strikes the bottom of the receiving-case the said couplings will be automatically disengaged and liberated, so that the cords and couplings may be quietly withdrawn. These couplings, however, are not claimed herein, and hence are not specifically shown and described. Resuming now the shaft connections 9 and 10, it has been seen that the prolongations $D^2$ of shafts D and D' have their bearing $d$ between gears $d'$ and coupling-heads 9 outside said bearings, and an engaging pin or lug $d^4$ off the center of said head is adapted to enter a hole $d^5$ in the head 10 on shaft D or D', and thus make rotative engagement, and this is their normal relation; but when the outer pipes are disjointed separation also occurs here, so that the gears in the elbows remain connected and go with the head end of the frame when the frame is knocked down for transportation or storage.

In order that the shafts D and D' shall always be in wound-up condition and ready for use and that they may be secured in such condition when the frame is separated, I provide a spring-lock $n$, adapted to engage in a notch or recess in the edge of head 10 and hold it from rotation, and the lock is released by the head 9 when it is pressed inward in the setting up of the frame and connecting of the parts again for use. The spring $n$ is also kept out of locking engagement by head 9 when the parts are in use.

What I claim is—

1. The main frame consisting of the side tubes, the end tubes and the elbows at the corners, sectional side shafts and pinions in said tubes, and the ends of the shafts and pinions confined in the said elbows, whereby the pinions and the shorter shaft-sections are made removable together, substantially as described.

2. A knockdown burial apparatus having a separable operating-shaft, heads on the adjacent ends of said shaft and a spring-pressed lock to engage one of said heads and prevent its rotation, substantially as described.

3. In burial apparatus, a knockdown frame separable at its four corners and consisting of a full-length tube at each side and a cross-tube at each end and corner-elbows, in combination with an operating-shaft in each side tube and one end tube and pinions supported in said elbows operatively connecting said shafts, and lowering-cords supported on the side shafts in the side tubes, substantially as described.

Witness my hand to the foregoing specification this 22d day of April, 1899.

JACOB PFEIFFER.

Witnesses:
ANNA RAMPAUELLI,
MERTIE M. DOUGHERTY.